United States Patent [19]
Richardson

[11] Patent Number: 5,720,368
[45] Date of Patent: Feb. 24, 1998

[54] SNUBBER FOR A HYDRAULIC CYLINDER

[75] Inventor: Warner G. Richardson, Shorewood, Ill.

[73] Assignee: Caterpillar Inc., Peoria, Ill.

[21] Appl. No.: 813,959

[22] Filed: Mar. 3, 1997

[51] Int. Cl.⁶ .................................................. F16F 9/48
[52] U.S. Cl. .......................... 188/287; 188/285; 267/116
[58] Field of Search ............................. 188/285, 287, 188/319, 322.14, 322.15–322.19; 267/64.11, 64.15, 64.23, 64.25, 64.26, 116, 126, 196, 217

[56] References Cited

U.S. PATENT DOCUMENTS

| | | | |
|---|---|---|---|
| 2,783,859 | 3/1957 | Patuquin | 188/287 |
| 3,006,628 | 10/1961 | Utting. | |
| 3,419,114 | 12/1968 | Rumsey. | |
| 3,495,719 | 2/1970 | Peppers. | |
| 3,510,117 | 5/1970 | Scholin et al. | 267/116 |
| 3,605,960 | 9/1971 | Singer | 188/287 |
| 3,797,615 | 3/1974 | Stembridge. | |
| 3,944,198 | 3/1976 | Sakamoto | 267/116 |
| 4,057,129 | 11/1977 | Henuells | 188/285 |
| 4,078,638 | 3/1978 | Koyama et al. | 267/116 |
| 4,438,909 | 3/1984 | Matsumoto. | |

FOREIGN PATENT DOCUMENTS 720 302   6/1942  Germany.

*Primary Examiner*—Chris Schwartz
*Attorney, Agent, or Firm*—Calvin E. Glastetter

[57] ABSTRACT

Snubbers are useful in dampening inertia loads at the end of stroke movement of hydraulic cylinders. The known snubbers have one part attached to a piston rod assembly and another part on the cylinder assembly thereby any misalignment between the piston rod and cylinder assembly will produce inconsistent snubbing action. The subject snubber mechanism of the invention is attached to the cylinder assembly and includes a sleeve position around a stem, the sleeve is moved from a first position to a second operative position by contact with the piston rod assembly. The stem defines a variable rate flow path continuously communicating an actuating chamber with a pressure source as controlled by movement of the sleeve relative to the stem.

5 Claims, 1 Drawing Sheet

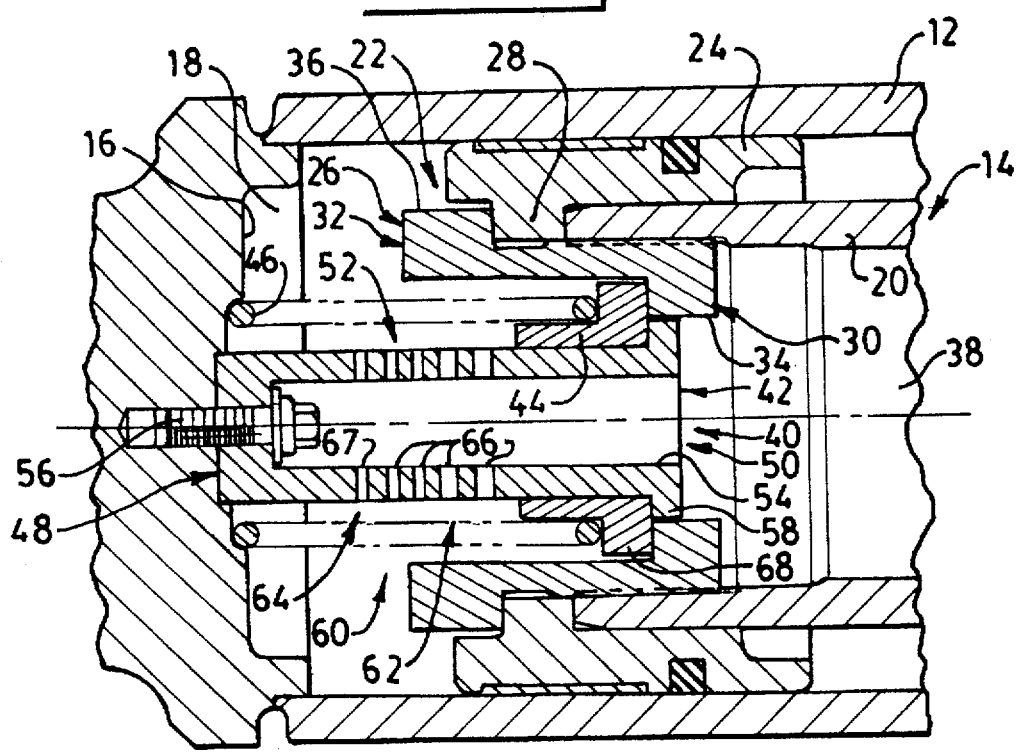
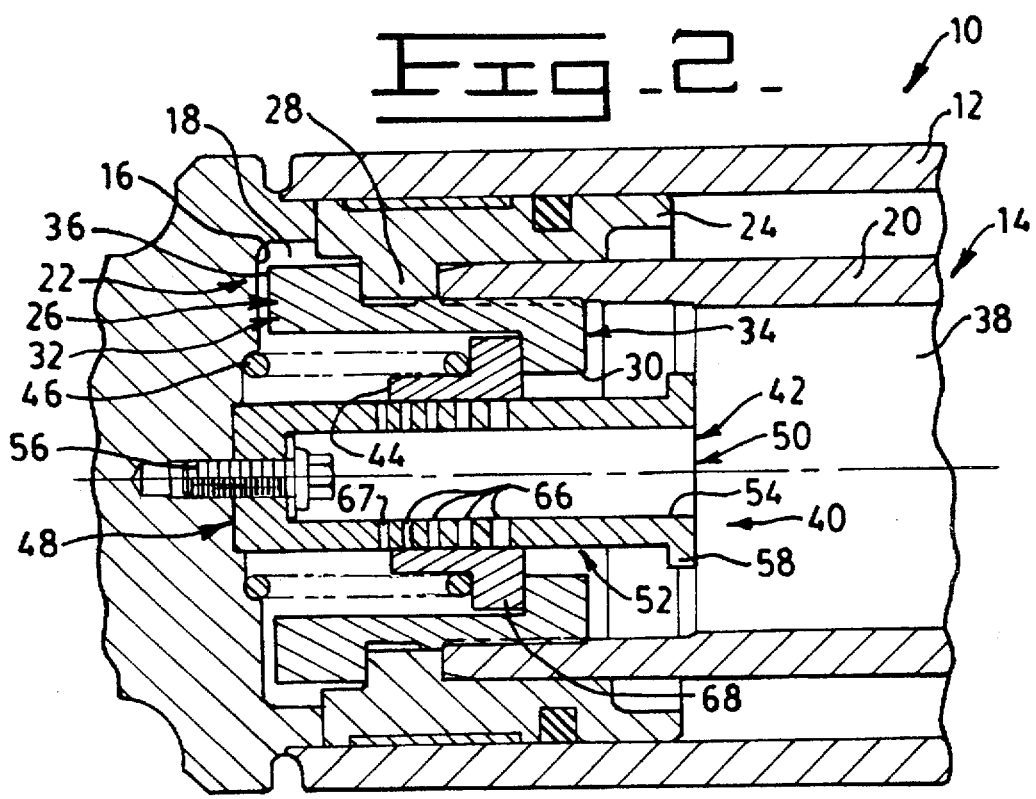

SNUBBER FOR A HYDRAULIC CYLINDER

TECHNICAL FIELD

This invention relates to a linear hydraulic cylinder and more particularly to a hydraulic cylinder having a cushioning device or snubber for dampening inertia loads at the end of stroke movement of a piston of the cylinder.

BACKGROUND ART

Linear hydraulic cylinders or jacks are commonly used for moving one member relative to another member. Serious problems can be encountered in the operation of such hydraulic cylinders as a result of impact of the piston against the end structure of the cylinder or impact between the members being controlled by the hydraulic cylinder. Such impacts can disturb work operations, cause undesirable noise and can cause damage to the cylinder itself or to the members operated thereby if sizable shock forces are generated. To reduce or eliminate such shock forces, hydraulic cylinders have heretofore been equipped with end of stroke cushioning devices which act essentially to progressively restrict fluid discharge from the cylinder as the piston approaches the end of travel or the members controlled thereby approach each other.

As heretofore constructed, such cushioning devices normally include a plunger which enters a cavity to establish a restrictive orifice a predetermined distance prior to the hydraulic cylinder reaching its end of stroke position. The restrictive orifice restricts the flow of fluid discharged from an actuating chamber until the end of stroke is reached. One of the problems encountered therewith is that one part is attached to the rod assembly and the other part is on the cylinder assembly. Because of the tolerance on the parts and the misalignment between the rod assembly and the cylinder assembly, the snubbing action is inconsistent. Another problem encountered with such cushioning devices is that they are not readily adaptable to a hydraulic cylinder commonly used as the hoist cylinder for raising a truck body relative to the frame. The cylinders normally are extended by directing hydraulic fluid through the piston rod into the actuating chamber and conversely are retracted by directing the fluid discharged from the actuating chamber through the piston rod.

Thus, it would be desirable to provide a snubber or cushioning device having good snubbing capabilities that are consistent at the end of stroke of the hydraulic cylinder and is suitable for use on a hoist cylinder.

The present invention is directed to overcoming the problems set forth above.

DISCLOSURE OF THE INVENTION

In one aspect of the present invention, a snubber is provided for a hydraulic cylinder having a cylinder assembly and a piston rod assembly reciprocatably mounted within the cylinder assembly defining an actuating chamber adjacent an end surface of the cylinder. The piston rod assembly has a fluid passage therein for transmitting hydraulic fluid into and out of the actuating chamber. A stem defining a bore is attached to the end surface of the cylinder assembly. The stem includes a orifice means for allowing fluid flow between the actuating chamber and the bore. A sleeve is slidably positioned on the stem and is moveable to block fluid flow through the orifice. The sleeve is moveable from a first position to a second position by movement of the piston rod assembly. A spring resiliently biases the sleeve toward the first position.

BRIEF DESCRIPTION OF THE DRAWINGS

FIG. 1 is a cross-sectional view of an embodiment of the present invention with the snubber mechanism in a neutral position.

FIG. 2 is a cross-sectional view with the snubber mechanism shown at the end of piston rod stroke.

BEST MODE FOR CARRYING OUT THE INVENTION

A hydraulic cylinder assembly 10 includes a tubular hydraulic cylinder 12 and a piston rod assembly 14 reciprocatably disposed within the cylinder and moveable toward and away from an end surface 16 of the cylinder 11 to define a variable volume actuating chamber 18. The piston rod assembly 14 includes a tubular piston rod 20 having a piston assembly 22 suitably secured thereto and slidably disposed within the cylinder 12. The piston assembly 22 includes a piston 24 and a retainer 26. The piston 24 is positioned between the hydraulic cylinder 12 and the tubular piston rod 20 and includes a inwardly extending annular flange 28 having a side surface positioned to contact a end of the tubular piston rod 20. The retainer 26 has a first end portion 30 and a second end portion 32. The first end portion 30 is threadably attached to the tubular piston rod 20 and includes an inwardly extending annular flange 34. The second end portion 32 has an outwardly extending annular flange 36 positioned to contact a second side surface of the flange 28 of the piston 24. The tubular piston rod 20 forms a fluid passage 38 for introducing fluid into and exhausting fluid from the actuating chamber 18.

A snubber assembly 40 includes a tubular stem 42, a sleeve 44 positioned around the tubular stem 42 and a spring 46 for biasing the sleeve away from the cylinder end surface 16. The tubular stem 42 has a first end portion 48, a distal second end portion 50, a intermediate portion 52 therebetween and a bore 54 extends axially from the second end portion 50 toward the first end portion 48. A fastening means, such as a bolt 56 is used to fasten the first end portion 48 of the stem 42 to the end 16 of the cylinder. Although a bolt 56 is shown it is recognized that other fastening means, such as welding, can be used without departing from the scope of the invention. The second end portion 50 of the stem 42 includes an outwardly extending annular flange 58. The intermediate portion 52 provides a variable flow path 60 for communicating the actuating chamber 18 with the fluid passage 38. The flow path 60 includes, for example, a variable area orifice means 62 and a fixed area orifice means 64 for continuously communicating the bore 54 with the actuating chamber 18 at all positions of the sleeve 44. The variable orifice means includes a plurality of radially extending ports 66 passing through a wall of the stem 42. The diameter of the ports 66 digress from the second end portion toward the first end portion. The fixed area orifice means 64 includes a radially extending port 67 also passing through the wall of the stem 42.

The sleeve 44 is slidably positioned around the stem 42 and includes an outwardly extending flange 68. The sleeve 44 is biased to a first position by the spring 46 positioned between the end 16 of the cylinder 12 and the flange 68. When in the first position the sleeve 44 is in contact with the flange 58 of the stem 42. The sleeve 44 is moved from the first position to a second position when the piston rod assembly 14 is retracted and the annular flange 34 of the retainer 26 contacts the annular flange 58. Retraction of the piston rod assembly 14 is stopped when the piston 24 contacts the end 16 of the cylinder 12. When the sleeve 44 is in its second position the ports 66 are covered and communication from the actuating chamber 18 therethrough is blocked, however the port 67 is not affected and communication therethrough is permitted.

Industrial Applicability

In operation, retracting the piston rod assembly 14 is accomplished by venting the hydraulic fluid in the actuating chamber 18 through the fluid passage 38 to a pressure source (not shown). It will be understood that the hydraulic cylinder in many cases supports a load such that gravitational or other forces can cause the piston rod assembly 14 to move toward the end surface quite rapidly thereby generating high inertia loads. It is also understood that during retraction, the relationship of the retainer 26 contacting the sleeve 44 and preventing flow around the snubber assembly 40 is shown in FIG. 1. When the retainer 26 in contact with the sleeve 44 of the snubber assembly 40 all the fluid being vented from the actuating chamber 18 must flow through the ports 66,67 into the stem 42 and out the fluid passage 38. When the sleeve 44 is not in contact with the flange of the retainer it is biased to its first position by the spring 46. When the sleeve is in its first position and not contacting the flange of the retainer all ports are open and fluid can flow through and around the stem into and out of the actuating chamber.

As the piston rod assembly 14 retracts the flange 34 of the retainer 26 contacts the flange 68 of the sleeve 44 and moves the sleeve 44 toward the end surface 16. Movement of the sleeve toward the end surface will overcome the biasing force of the spring 46. Continued movement of the piston rod assembly 14 toward the end surface 16 causes the sleeve 44 to sequentially block the ports 66 so as to cause the escape path of fluid from the actuating chamber 18 to be progressively restricted. When the piston 24 reaches a preselected distance from the end 16, the snubber sleeve 44 reaches its second position such that fluid flow through the ports 66 is completely blocked and the fluid flow exhausted from the actuating chamber must pass through the port 67. The fluid being exhausted from the actuating chamber 18 passing through only port 67 at a minimum flow rate so that retracting movement of the piston rod assembly is quickly decelerated to stop the piston rod assembly in a smooth controlled manner so as to alleviate any substantial impact at the end of stroke movement of the piston rod assembly. When fluid is subsequently directed through the passage 38 to extend the hydraulic cylinder, the fluid initially passes through the port 67 to pressurize the actuating chamber 18. As the piston rod assembly 14 is extending the spring 46 will bias the sleeve 44 toward its first position. As the sleeve is moving towards its first position the ports 66 are progressively uncovered to allow more fluid flow into the actuating chamber 18. Movement of the sleeve is stopped when it contacts the flange 58 of the stem 42. Thus fluid is allowed to also flow around the stem to extend the piston rod assembly.

In view of the above, it is readily apparent that the structure of the present invention provides an improved snubber effective in decelerating the movement of the piston rod assembly in the last stages of the retracting stroke for stopping the piston rod assembly in a smooth controlled manner that is consistent and operates the same every time.

Other aspects, objects and advantages of this invention can be obtained from a study of the drawings, the disclosure and the appended claims.

I claim:

1. A snubber for a hydraulic cylinder having a cylinder assembly and a piston rod assembly reciprocatably mounted within the cylinder assembly defining an actuating chamber adjacent an end surface, the piston rod assembly having a fluid passage therein as the only means for transmitting hydraulic fluid into and out of the actuating chamber, comprising:

a stem defining a bore attached to the end surface of the cylinder assembly and including an orifice means for allowing fluid flow from the actuating chamber into the bore and the fluid passage in the piston rod assembly;

a sleeve slidably positioned on the stem and being moveable to partially block fluid flow through the orifice means, the sleeve is moveable from a first position to a second position by movement of the piston rod assembly; and a spring resiliently biasing the sleeve toward the first position.

2. The snubber of claim 1 wherein the orifice means includes a plurality of ports having variable areas for allowing fluid flow into and out of the actuating chamber.

3. The snubber of claim 2 wherein the sleeve sequentially blocks the variable area orifice ports when being moved from the first position toward the second position.

4. The snubber of claim 3 wherein the the wall of the stem includes a fixed area orifice including at least one radial port continuously communicating the actuating chamber with the bore in the stem.

5. The snubber of claim 4 wherein the sleeve is moved from the first position to the second position by a retainer attached to the end of the piston rod assembly.

* * * * *